Oct. 16, 1934.     J. F. ROBB     1,977,013
FIFTH WEEL CONSTRUCTION
Filed Aug. 1, 1933     2 Sheets-Sheet 1
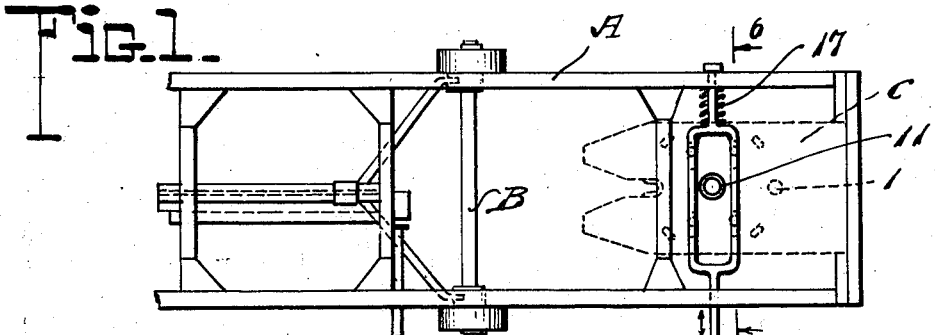
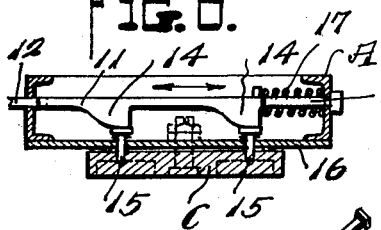
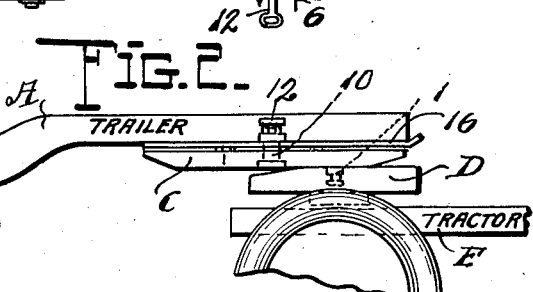
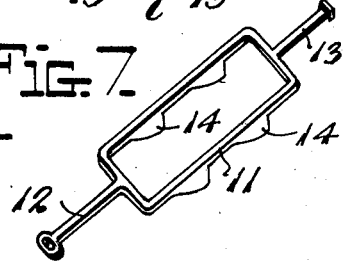
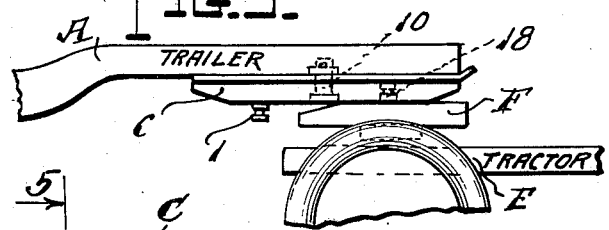
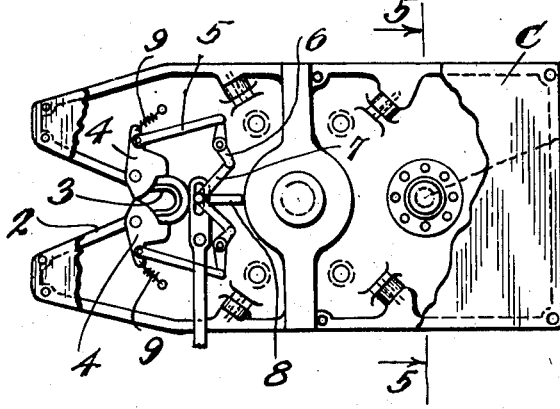
Inventor
JOHN F. ROBB.
By Robb & Robb
Attorneys Oct. 16, 1934.   J. F. ROBB   1,977,013
FIFTH WHEEL CONSTRUCTION
Filed Aug. 1, 1933   2 Sheets-Sheet 2
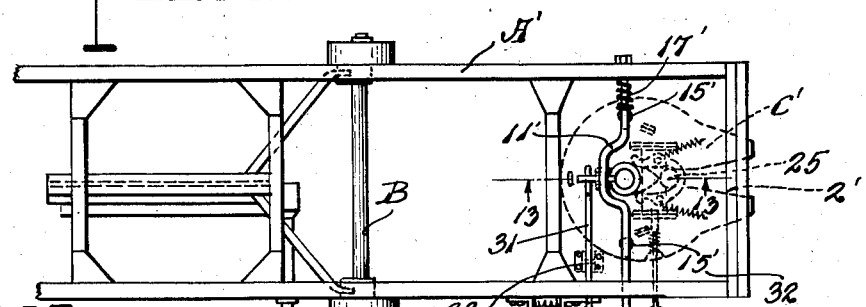
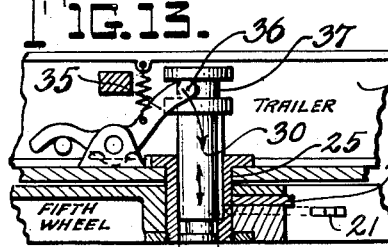
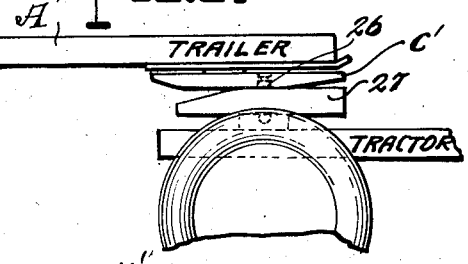
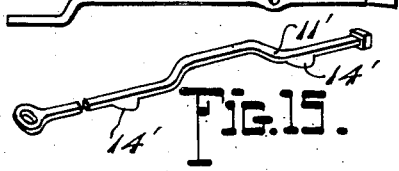
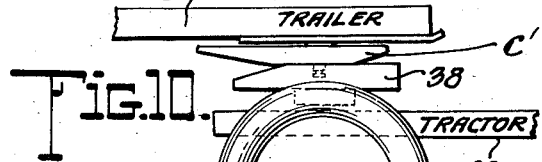
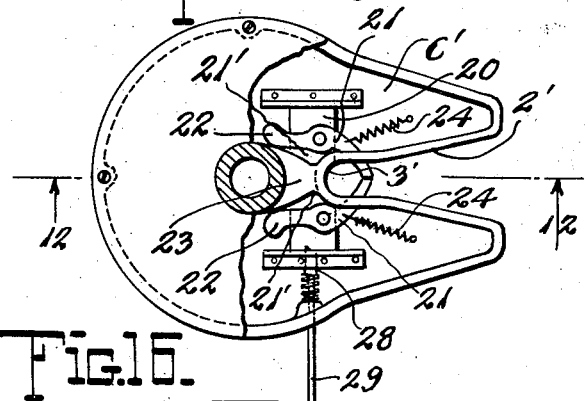
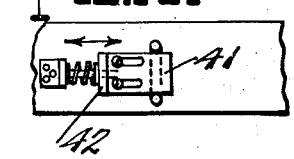
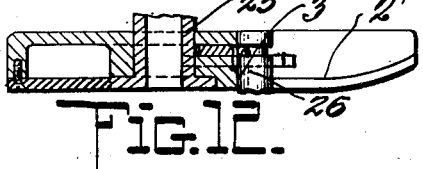
Inventor
JOHN F. ROBB
By Robb & Robb
Attorneys Patented Oct. 16, 1934

1,977,013

UNITED STATES PATENT OFFICE 1,977,013

FIFTH WHEEL CONSTRUCTION

John F. Robb, Cleveland Heights, Ohio, assignor to Highway Trailer Company, Edgerton, Wis., a corporation Application August 1, 1933, Serial No. 683,210

13 Claims. (Cl. 280—33.1)

The present invention relates to the art of tractor-trailer combination vehicles.

The invention comprises a novel form of reversible fifth wheel for application to the front end of a trailer vehicle and carrying interchangeably and/or alternatively usable coupling instrumentalities so that the trailer may be coupled to tractor vehicles having different types of coupling instrumentalities to cooperate with those upon the trailer.

More specifically, the invention comprises a trailer construction with the mounting at the front end portion of the trailer of a fifth wheel equipped with a male coupling member in the form of a king pin and also equipped with a female coupling member with associated coupling parts. This fifth wheel may be turned on the trailer into adjustably held positions in one of which the king pin may be employed and rendered operative for coupling the trailer with the female coupling device carried by the fifth wheel of a tractor vehicle.

In another position of its adjustment, the fifth wheel on the trailer will have its female coupling instrumentalities adjusted to an operative position so that if the tractor vehicle is equipped with a fifth wheel having a king pin coupling device, said female coupling instrumentalities will work in conjunction with the said king pin on the tractor vehicle fifth wheel to establish the coupling relation between the tractor vehicle and the trailer.

The invention involves certain modified adaptations in respect to the construction of the fifth wheel itself, the means for locking or holding the fifth wheel in its different adjusted positions to bring its different types of coupling instrumentalities to play for operation, and in respect to the forms of the coupling instrumentalities themselves, all as will be hereinafter presented more fully on reference to the accompanying drawings, in which:—

Figure 1 is a top plan view of the front end of a trailer showing one form of my invention, using a certain type of lock device for holding the trailer fifth wheel in adjusted positions.

Figure 2 is a side elevation of the parts shown in Figure 1, the male king pin coupling member of the fifth wheel being in operative position.

Figure 3 is a view similar to Figure 2 with the king pin member of the fifth wheel out of use, and the female coupling mechanism in use.

Figure 4 is a plan view partially broken away to bring out more fully the locking mechanism of the female coupling instrumentalities of the fifth wheel.

Figure 5 is a sectional view on the line 5—5 of Figure 4.

Figure 6 is a sectional view on the line 6—6 of Figure 1.

Figure 7 is a perspective view of the wedge locking device of the construction of the figures just referred to.

Figure 8 is a view similar to Figure 1 but showing a modified form of fifth wheel in respect to both the locking means for holding the fifth wheel in its different operating positions and the locking means for the female coupling mechanism.

Figure 9 is a fragmentary side elevational view of the construction of Figure 8 showing the female coupling mechanism in use.

Figure 10 is a view similar to Figure 9 showing the male or king pin coupling mechanism of the trailer in use.

Figure 11 is a plan view partially broken away and partially in section to show the locking devices illustrated in the modification of Figures 8 to 15 inclusive.

Figure 12 is a sectional view taken about on the line 12—12 of Figure 11.

Figure 13 is a sectional view taken about on the line 13—13 of Figure 8, and illustrating in full lines, the male member or king pin out of use, and in dotted lines the adjustment of said king pin when in use.

Figure 14 is a view of the king pin actuating bar.

Figure 15 is a perspective view of the fifth wheel locking bar.

Figure 16 is a view of the latch plate device cooperating with the king pin actuating lever.

Referring to the constructions of Figures 1 to 7 of the drawings, A denotes the trailer frame, B the front wheel support for the said frame when it is disconnected from the tractor vehicle and C the adjustable fifth wheel construction. The fifth wheel C carries adjacent to one end portion thereof, the king pin 1, seen best in the reversed position in Figure 3.

At the rear end of the fifth wheel, as shown in Figures 1 and 4, a female coupling device is provided, which includes the split or passage portion 2 of the fifth wheel itself, having a socket 3 at its inner or apex portion to receive the king pin on the tractor vehicle. Locking members 4 actuated by links 5, levers 6, links 7 and a pull member 8 are employed to move the locking members 4 so they will recede from their projected positions in the passage 2 when it is desired to release the king pin that may be locked in place by said locking members 4. This mechanism is somewhat similar to the locking mechanism of the Martin and Farr United States Patent No. 1,412,025.

Springs 9 are used to normally press the locking members 4 to project into the passage 2. The fifth wheel C is mounted to turn upon a central axis journal member 10, seen best in Figures 2 and 4.

It is to be understood that I may use any suitable lock means 4 for the female coupling feature of my fifth wheel C. In other words, I do not wish to be limited to the specific locking means I illustrate, because a large number of similar locking devices might be availed of readily for the same purpose of locking the king pin in the seat at the inner end or apex of the passage 2.

I use some suitable locking device for holding the fifth wheel C in the position in which it is adjusted, according to Figures 1 and 2, and also in its reversed position of Figure 3. In Figures 1 and 2, the king pin 1 is at the end of the front portion of the fifth wheel, and in Figure 3, the fifth wheel is reversed so that the king pin 1 is at the rearmost adjusted portion of the fifth wheel. For locking the fifth wheel, the locking frame 11 is employed as seen in Figure 7, and has at one end, a handle guide 12, and at the other end, a guide member 13. Wedge parts 14 on the locking frame 11 are adapted to engage spring retracted plungers 15 on the trailer frame plate 16, and passing through openings in this frame plate 16 so as to enter openings in the upper portion of the fifth wheel C as well shown in Figure 6. Normally, a spring 17 tends to force the locking frame wedge parts 14 in to a position to project the plungers 15 into engagement with the fifth wheel C.

The above construction understood, as explained, its operation will be very clear.

In the position of the parts in Figures 1 and 2, the trailer fifth wheel C has its king pin 1 ready to engage with the female fifth wheel coupling means D on the tractor E, which female coupling means may be of a conventional type of split fifth wheel construction commonly in use today, and an example of which is depicted in Martin and Farr United States Patent No. 1,412,025, previously referred to.

According to the arrangement of the parts in Figure 3, the fifth wheel C has been reversed so as to arrange near the front end of the trailer, the female coupling devices of the fifth wheel C as shown most clearly in Figure 4. With the female coupling devices thus positioned, as in Figure 3, and rendered operative, it will be obvious that the same are arranged to coact with a male coupling means F of the tractor vehicle E as shown in Figure 3. Said male coupling means consists merely of an upstanding king pin 18 on the male fifth wheel coupling device F, this being a standard type of fifth wheel at present in use.

In reference to both of the adjustments of the fifth wheel in Figures 1 and 2, and that of Figure 3, the locking frame 11 will be actively adjusted to lock the fifth wheel C from turning.

Thus by the use of the special type of fifth wheel C above described, my trailer is equipped to couple and uncouple with tractor vehicles having either a female type of coupling fifth wheel or a male type of coupling fifth wheel, the only thing necessary being to adjust the fifth wheel C to bring its proper coupling means into action, dependent upon the kind of coupling device that may be carried by the fifth wheel of the tractor vehicle.

A' denotes the trailer frame in Figures 8, 9, and 10, and C' my modified form of fifth wheel which comprises the king pin receiving portion 2' having the king pin socket 3' at the apex thereof, the same constituting the female member of a known type of construction such as found in the Martin and Farr patent previously referred to. Upon the fifth wheel C' is mounted a carrier 20 adapted to slide forwardly and rearwardly in relation to the king pin seat or socket 3'. On this carrier 20 are mounted the locking members 21 having the tails 22 thereof engaging a wedge-shaped abutment 23 projecting forward from the axis portion of the fifth wheel C'. Normally the locking members 21 are held open at their front hook ends by means of springs 24. Each locking member 21 is provided with a tail portion 22 adapted to slide on the opposite wedge surfaces of the wedge-shaped abutment 23 that projects forwardly from the axial portion 25 of the fifth wheel C', springs 24 normally tending to hold the hook portion of the locking members 21 in open positions. The front edge portion of the carrier 20 is adapted to project forwardly into the king pin socket 3' of the fifth wheel and when the king pin 26 of the lower tractor fifth wheel 27, see Figures 9 and 12, enters the socket 3', it will abut with the carrier 20 and slide the same rearwardly, meanwhile sliding the tails 22 along the wedge-shaped abutment 23, thereby causing the locking members 21 to close and embrace the king pin 26 so as to lock the same to the fifth wheel C'.

When the carrier 20 has been forced rearwardly to the position of Figure 11, causing the locking members 21 to close around the king pin 26, the carrier will be automatically locked in its rearward position, thus holding the locking members 21 in their locked position by means of a spring actuated automatic latch 28 which is adapted to be withdrawn by manual operation by means of a handle rod 29, when it is desired to release the king pin and permit separation of the fifth wheel 27 from the fifth wheel C'.

In this present construction the fifth wheel C' is a rigid horizontal fifth wheel, but like the fifth wheel C previously described in reference to the first construction of my invention set forth, said fifth wheel C' may be revolved about its axis 25, which connects it to the frame of the trailer, and by such revolution the female or split portion of the fifth wheel may be reversed and arranged rearwardly as shown in Figure 10. The fifth wheel C' is equipped with a retractable or disappearing king pin 30, see Figure 13, said king pin 30 forming a male member adapted to be used alternatively with and interchangeably with the female member of the fifth wheel C', so that when the trailer A' is to be connected with a tractor fifth wheel of the female type, the king pin 30 may be thrown into action. For this purpose I provide a lever 31 pivoted on the frame plate 32 of the trailer A' at the point 33. The lever 31 has a handle 34, and by rocking the lever, its inner end may be raised to operate a bell crank lever 35 which has a fork 36 engaging a grooved portion 37 at the upper end of the king pin 30. Thus the king pin 30 may be slid downwardly and projected from the hollow axis portion 25 provided for the fifth wheel C', under which conditions the king pin 30 will assume the dotted line position of Figure 13, and the position in which it is shown in Figure 10.

It being borne in mind that when the king pin 30 is in use, the female coupling means of the fifth wheel C', as seen in Figure 8, is reversed, it is evident that the king pin 30 under such conditions will be in a proper position to engage with the split or female coupling means on the tractor fifth wheel 38, see Figure 10, said tractor fifth wheel 38 being substantially of the type of the Martin and Farr patent previously referred to and being carried by the tractor 39 having the rear wheels 40.

For locking the fifth wheel C' in either of its reversed positions, that is, with the female coupling means 2', 3', 21, etc., either active as shown in Figure 8, or inactive as per the adjustment in Figure 10, I employ a locking bar or frame member 11' somewhat similar to the locking frame 11 of Figure 1 operated by the handle portion 12'. This locking bar 11' is actuated by the spring 17' so as normally to be projected laterally from the frame of the trailer A' to act upon a pair of locking members 15' similar to the members 15 of Figure 6. For the above purpose the locking frame or bar 11' has the wedging cams 14' similar to those previously described.

It is to be understood that I do not wish to be limited to the locking mechanism comprising the parts 21, 20, 28, 23, etc., as shown in Figures 8 and 11, since I may avail of the precise locking mechanism shown in Figure 4 in substitution therefor. In other words, the locking contrivances for the split fifth wheel used by me in the two constructions of my invention herein described are not material to the invention so far as the specific nature of these contrivances is concerned, though they possess specific novelty over anything used in the prior art, so far as I am aware. My intent in showing the said locking contrivances merely is to disclose an operative arrangement of locking parts for the king pin member that will be cooperative therewith and carried by the tractor fifth wheel so that it will be understood in considering the claims, annexed hereto, that any suitable locking mechanism might be availed of and many forms of such locking devices are to be found in the prior art.

My invention resides primarily in the employment of the reversible fifth wheel feature of my invention, carried by the trailer, said fifth wheel in both constructions being equipped with alternatively or interchangeably usable female and male coupling parts. In the construction of Figures 1 to 7 inclusive the male coupling king pin is eccentric to the axis of the fifth wheel C, whereas in the construction of Figures 8 to 16 inclusive the king pin on the trailer is coaxial or concentric with the axis of the fifth wheel C'.

In Figure 16 I show a spring pressed latch plate slidable on the frame of the trailer and adapted to be manipulated by a hand-piece 42, said latch plate being designed to engage over the handle 34 of the lever 31 in order to lock the lever in a position holding the king pin 30 in its down or operative position.

Having thus described my invention, what I claim as new and desire to secure by Letters Patent of the United States, is—

1. In combination, a trailer for tractor-trailer vehicle combinations, and interchangeably and independently usable female and male coupling devices constituting a unitary dual purpose fifth wheel mounted on said trailer, and means for alternatively presenting either of said coupling devices in position for use.

2. In combination, a trailer for tractor-trailer combination vehicles, a fifth wheel mounted on said trailer for adjustment to different positions, male and female coupling contrivances interchangeably usable and carried by said fifth wheel, and means for holding the fifth wheel of the said trailer in positions rendering either one or the other of the male and female coupling contrivances operative to coact with coupling means of a tractor vehicle.

3. In combination, a trailer for tractor-trailer combination vehicles, a fifth wheel carried by the trailer and adjustable to different positions, male and female coupling devices carried by the fifth wheel and adapted to be interchangeably used in connection with coupling means on a tractor vehicle, and lock mechanism for holding the fifth wheel in its different positions of adjustment respecting its mounting on the trailer, whereby to bring into action either one of the coupling devices carried by said fifth wheel.

4. In combination, a trailer for tractor-trailer combination vehicles, a reversible fifth wheel carried by the trailer, male and female coupling devices carried by the fifth wheel and adapted to be interchangeably used in connection with coupling means on a tractor vehicle, lock mechanism for holding the fifth wheel in either of reversed positions respecting its mounting on the trailer, whereby to bring into action either one of the coupling devices carried by said fifth wheel, and an axis for the fifth wheel whereby it may be rotated in order to bring either of its coupling devices into proper position for use.

5. In combination, a trailer for tractor-trailer combination vehicles, a reversible fifth wheel carried by the trailer, male and female coupling devices carried by the fifth wheel and adapted to be interchangeably used in connection with coupling means on a tractor vehicle, lock mechanism for holding the fifth wheel in either of reversed positions respecting its mounting on the trailer, whereby to bring into action either one of the coupling devices carried by said fifth wheel, and an axis for the fifth wheel whereby it may be rotated in order to bring either of its coupling devices into proper position for use, the coupling devices of the fifth wheel being disposed eccentric to the said axis.

6. In combination, a trailer for tractor-trailer combination vehicles, a reversible fifth wheel carried by the trailer, male and female coupling devices carried by the fifth wheel and adapted to be interchangeably used in connection with coupling means on a tractor vehicle, and lock mechanism for holding the fifth wheel in either of reversed positions respecting its mounting on the trailer, whereby to bring into action either one of the coupling devices carried by said fifth wheel, and an axis for the fifth wheel whereby it may be rotated in order to bring either of its coupling devices into proper position for use, the coupling devices of the fifth wheel being disposed one eccentric to the axis of the fifth wheel and the other coaxial with the axis of the fifth wheel, together with instrumentalities for moving the coupling device coaxial with the axis of the fifth wheel into a projected operative position.

7. In combination, a trailer for tractor-trailer combination vehicles, a fifth wheel carried by the trailer and having female coupling mechanism thereon and a male coupling king pin carried by said fifth wheel, together with a device for moving said king pin into a projected position for use, and into a withdrawn position permitting use of said female coupling mechanism, said device including a lever operatively connected to said kingpin, a second lever coacting with said first lever and constituting the operating lever, and latch means coacting with said last mentioned lever for retaining said kingpin in at least one of its operated positions.

8. In combination, a trailer for tractor-trailer combination vehicles, a rotatable fifth wheel mounted on the trailer and having female and male coupling devices thereon, together with locking means to hold said fifth wheel in either of two positions, in one of which the female coupling means is operative and in the other of which the male coupling means is adjusted to an operative position.

9. In combination, a trailer for tractor-trailer combination vehicles, a horizontal fifth wheel mounted on the trailer, a connection between said fifth wheel and the trailer permitting movement of the said fifth wheel in a horizontal plane, and interchangeably usable male and female coupling devices on the fifth wheel adapted to be carried into a position for operation in conjunction with coupling means on a tractor fifth wheel by movement of said trailer fifth wheel in said horizontal plane, together with lock means for holding the fifth wheel in different positions of adjustment after movement in a horizontal plane.

10. In combination, a trailer for tractor-trailer combination vehicles, a fifth wheel adjustably mounted upon the trailer and comprising interchangeably usable male and female coupling devices, lock members intermediate the trailer and the fifth wheel, and a manual device for cooperation with said lock devices for locking the fifth wheel in different positions of adjustment on the trailer.

11. In combination, a tractor vehicle, a trailer vehicle, coupling mechanism on the trailer vehicle to connect with the tractor vehicle, coupling mechanism on the tractor vehicle to connect it with the trailer vehicle, one of said coupling mechanisms comprising an adjustably mounted movable fifth wheel having interchangeably usable male and female coupling members, and means for locking said fifth wheel in adjusted position with either one of its male or female coupling members in operative position according to the position of adjustment of the adjustable fifth wheel.

12. In combination, a tractor vehicle, a trailer vehicle, coupling mechanism on the trailer vehicle to connect with the tractor vehicle, coupling mechanism on the tractor vehicle to connect it with the trailer vehicle, one of said coupling mechanisms comprising a reversible fifth wheel, male and female coupling members carried by said reversible fifth wheel, and means for locking the fifth wheel in either of its reversed positions whereby to bring one or the other of the female and male coupling devices into an operative position for use.

13. In combination, a trailer, a unitary fifth wheel carried thereby and comprising male and female coupling devices for coaction with a tractor coupling device and arranged in spaced relation to each other, said fifth wheel being shiftable to bring one or the other of said coupling devices into operative relation to the tractor coupling device.

JOHN F. ROBB.